United States Patent [19]

Heussy et al.

[11] 3,845,737

[45] Nov. 5, 1974

[54] ENDLESS BELT PROCESSING APPARATUS

[75] Inventors: William C. Heussy, Shedd, Oreg.;
Earl L. Vetor, Anderson, Ind.; Keith P. Delaney, Philomath; Paul E. Hyde, Corvallis, both of Oreg.

[73] Assignee: Evans Products Company, Portland, Oreg.

[22] Filed: Sept. 15, 1972

[21] Appl. No.: 289,556

[52] U.S. Cl.................. 118/8, 118/414, 118/415
[51] Int. Cl........................ B05d 5/02, B05c 11/10
[58] Field of Search .......... 118/404, 405, 413, 414, 118/415, 8; 425/373, 150, 362

[56] References Cited
UNITED STATES PATENTS

| | | | |
|---|---|---|---|
| 1,257,962 | 3/1918 | Armitage | 118/413 |
| 2,919,673 | 1/1960 | Williams et al. | 118/8 |
| 3,024,948 | 3/1962 | Rabl | 242/280 |
| 3,032,006 | 5/1962 | Kahn et al. | 118/8 |
| 3,184,324 | 5/1965 | Ryckman | 118/314 X |
| 3,389,679 | 6/1968 | Weber et al. | 118/8 |
| 3,465,712 | 9/1969 | Ferris | 118/8 |

FOREIGN PATENTS OR APPLICATIONS 853,562    11/1960    Great Britain..................... 118/414

*Primary Examiner*—Ronald Feldbaum
*Attorney, Agent, or Firm*—Klarquist, Sparkman, Campbell, Leigh, Hall and Whinston

[57] ABSTRACT

An apparatus for controlling the deposition of powder on an endless moving belt has a headbox attached to a carriage positioned beneath the belt and mounted on linear bearings transversely slidable with respect to a base. A pair of cam followers mounted one on each side of the carriage make moving contact with the side edges of the moving belt. Transverse movement of the belt thereby causes corresponding transverse motion of the carriage to maintain the headbox in constant alignment with the belt.

10 Claims, 5 Drawing Figures

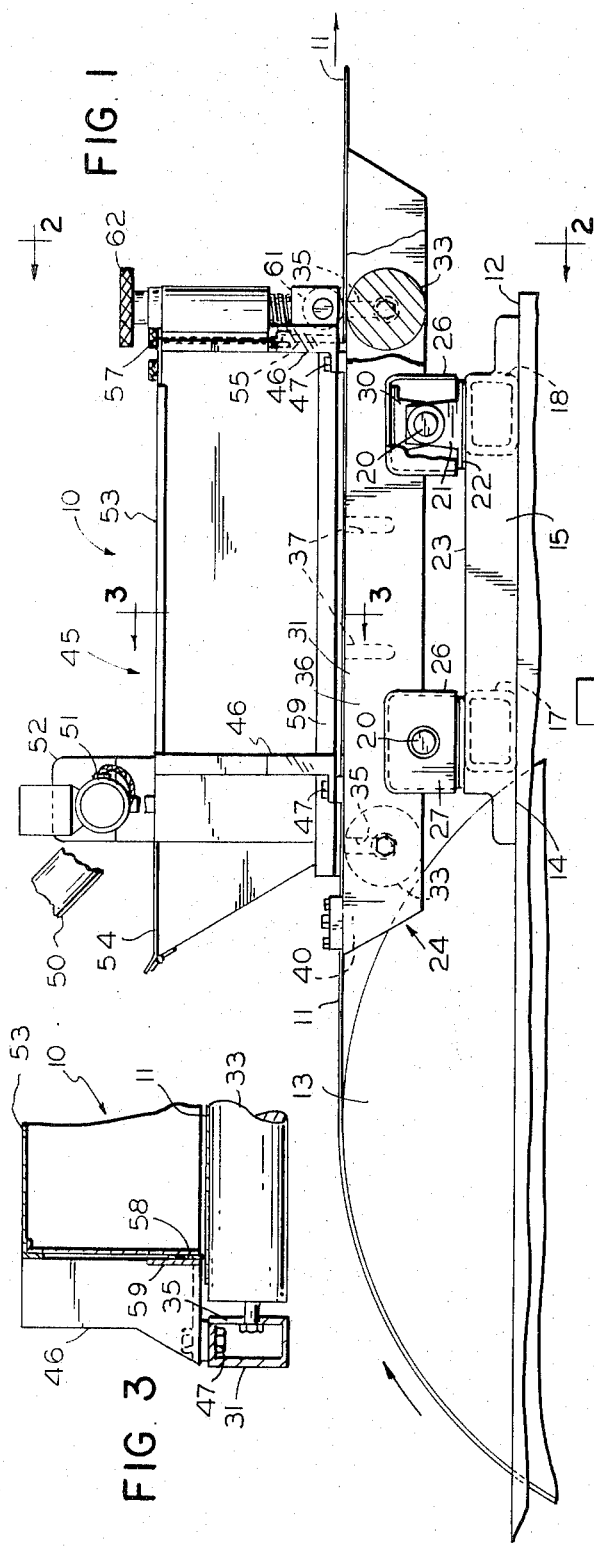
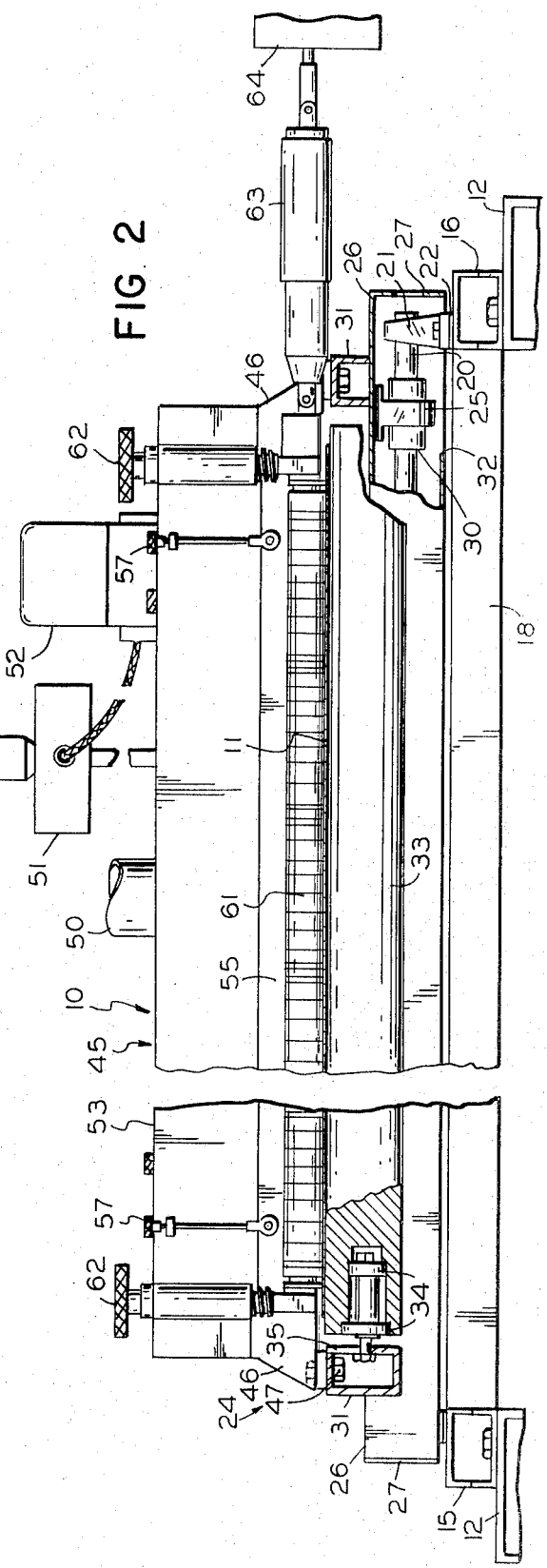

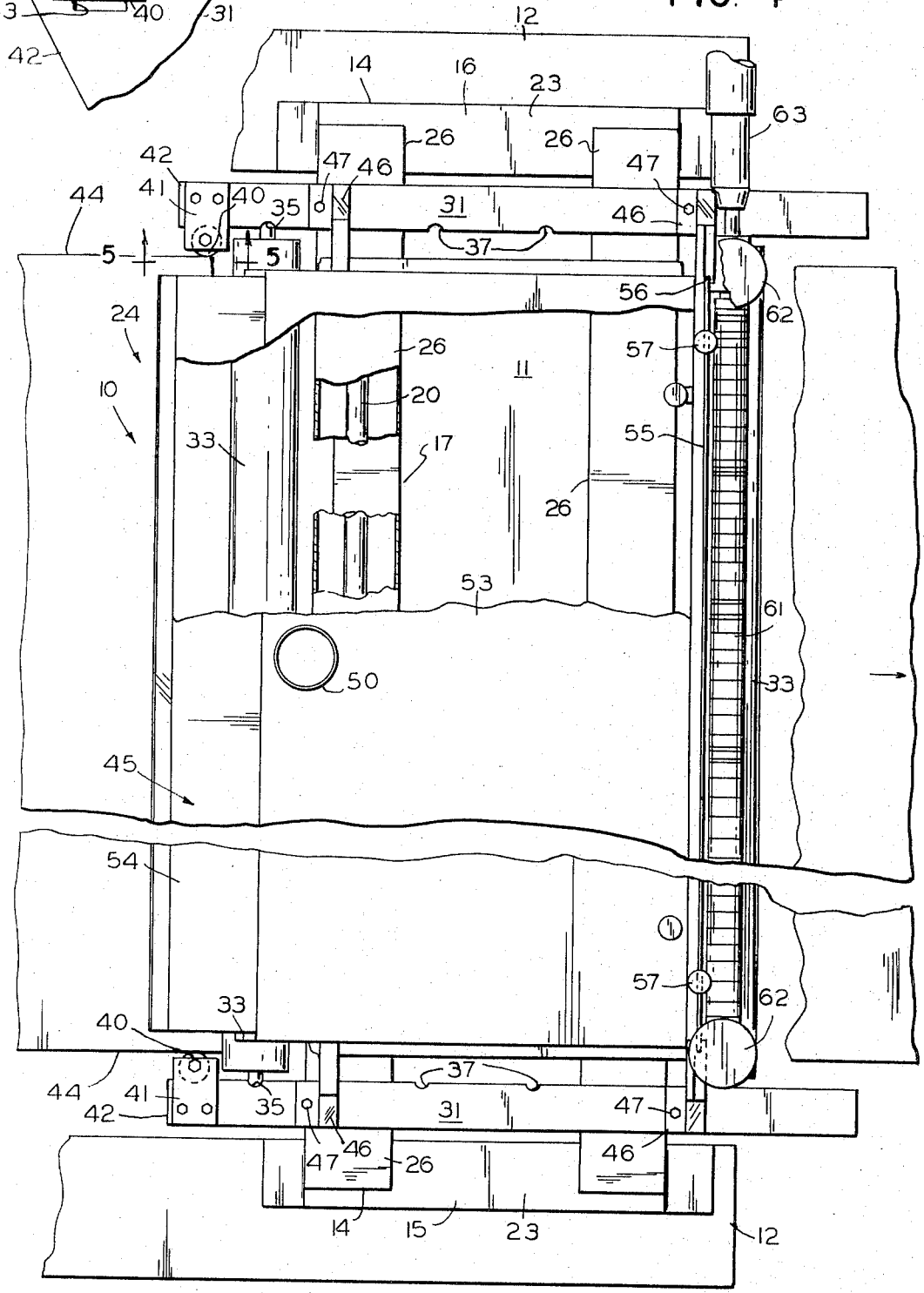

ENDLESS BELT PROCESSING APPARATUS

BACKGROUND OF THE INVENTION

This invention relates to processing apparatus for use with an endless belt, and, more particularly, to apparatus for controlling the deposition of powder and like materials on an endless moving belt.

The deposition of powder and similar materials on an endless moving belt, as for example, in the depositing of polyvinyl chloride powder on an endless moving metal belt during the formation of a battery separator product, has heretofore posed a number of difficult problems. Primary among these problems was that of securing constant transverse alignment of the deposition system with the continuously moving belt. An endless flat belt moving on support drums exhibits a transverse movement that cannot be accurately controlled. Accordingly, it has been difficult to effect matched tracking of the powder deposition system with the transversely moving belt.

Former methods of solving this problem included the use of wider-than-necessary belts in order to assure contact of the powder box seal with the belt at all times. Such excess belt width, however, necessitated expensive belt edge cleaning procedures.

Former methods also involved depositing the powder on the belt directly over one of the support drums. This, however, caused thickness control problems in the product when the belt was preheated, causing equipment distortion.

Accordingly, it is the primary purpose of the present invention to provide an apparatus to achieve matched tracking, i.e., optimum constant transverse alignment, of a powder deposition system with a continuously moving, endless flat powder processing belt.

It is a further object of the present invention to provide such apparatus that will deposit the powder off-the-drum, i.e., at a position on the belt other than directly over one of the supporting drums, thereby to avoid thickness control problems when the belt is preheated.

It is a still further object of the present invention to provide an apparatus of the type described that will minimize powder losses by accurately controlling powder flow during processing.

SUMMARY OF THE INVENTION

Our apparatus for controlling the deposition of powder and similar materials on an endless flat moving belt comprises base means and carriage means mounted on the base means beneath the endless moving belt at a location at which deposition of the materials on the belt is desired, said carriage means being transversely slideable with respect to the base means.

The apparatus further comprises belt follower means mounted on the carriage means and bearing on both edges of the belt. Such achieve movement of the carriage means transversely of the belt in either transversed direction to correspond with transverse movement of the belt.

The apparatus still further comprises powder deposition means mounted on the carriage means above the belt for depositing the powder on the belt. By this means the deposition means achieves a transverse travel corresponding to transverse movement of the carriage means and, consequently, constant alignment with the moving belt.

Apparatus according to the present invention has the further advantage of allowing nearly all of the belt width to be used for the product being made. This is in contrast to former procedures wherein a certain allowance had to be made in the width of the product being manufactured to compensate for side movement of the support belt as the latter moved from one support drum or end pulley to the other.

A still further advantage inherent in the apparatus of the present invention is in the capability of improved product thickness control, especially in situations where varying temperatures are imposed on the belt or pulleys. Former methods of manufacture significantly limited the benefits of belt preheating, which is an advantage in subsequent product processing. Since the deposition means in the instant apparatus is designed to move with the means of product support in all directions, the belt may be preheated to any desired level, subject only to further processing limitations, since tracking apparatus distortion due to temperature variance is negligible.

A still further advantage of the present apparatus lies in the inherent improvement in powder loss control. The apparatus permits incorporation of a level sensing system to deliver powder materials in a metered condition dependent solely on the product being manufactured. This is in contrast to former methods which relied on powder overflow and subsequent recycling, which methods resulted in significant powder losses.

BRIEF DESCRIPTION OF THE DRAWINGS

FIG. 1 is a side elevational view, with parts broken away, of an apparatus constructed in accordance with the present invention.

FIG. 2 is a front view taken on line 2—2 of FIG. 1.

FIG. 3 is a partial sectional view taken on line 3—3 of FIG. 1.

FIG. 4 is a plan view, with parts broken away, of the subject apparatus.

FIG. 5 is a partial sectional view taken on line 5—5 of FIG. 4.

DESCRIPTION OF THE PREFERRED EMBODIMENT

Referring to the drawings, the invention is more specifically described and illustrated in the form of a tracking headbox system 10 for off-the-drum deposition of a polyvinyl chloride powder on an endless moving flat metal belt 11 to make a battery separator product. As such, the apparatus includes a frame comprising a support 12 forward of the belt support drum or pulley 13 and to which is bolted a base 14 including tubular longitudinal subframe rails 15 and 16 joined by tubular transversely extending cross members 17 and 18.

A rod 20 is mounted at each end in a shaft support 21 on a pad 22 welded to the upper surface 23 adjacent each end of the longitudinal rails 15 and 16. Such furnishes base support for a transversely slidable carriage 24 positioned beneath the belt 11 forward of the drum 13 and mounted on linear bearings 25 transversely slideable on the rod 20.

The carriage 24 includes a pair of transversely extending tubular cross members 26 having end caps 27 and supported on machined pads 28 mounted on the linear bearings 25. The latter preferably take the form of ball bushings 30 transversely slidable on the rods 20. A pair of longitudinally extending tubular frame rails 31 are welded to the cross members 26 to form the carriage frame. The members 26 in turn are cut out on their bottoms as at 32 to permit the transverse movement of the carriage with respect to the base 14.

A pair of centerless ground rolls 33 mounted on end bearings 34 adjustably supported in vertical slots 35 in the rails 31 provide a flat powder deposition section 36 on the belt 11 extending the full width thereof and for a desired length downstream of the drum 13, as, for example, a 20 inch length. Alternate positions may be provided for the rolls 33 as by the additional slots 37 illustrated in dotted lines in FIG. 1.

Belt follower means in the form of spring loaded guide rollers or cam followers 40 are mounted on a plate 41 bolted to the upstream end 42 of and received in recesses 43 in the carriage rails 31, as shown. Each of the rollers 40 is adapted to contact or bear on a side edge 44 of the belt 11, thus to provide for transverse or side travel of the carriage 24 and the belt supporting rolls 33 in either transverse direction corresponding to transverse movement of the belt. Alternatively, the rollers 40 may be replaced by an air or optic sensing system to signal an electric or hydraulic mechanism to move the carriage 24 transversely corresponding to transverse movement of the belt.

Powder deposition means in the form of a headbox 45 adapted, for example, for deposition of polyvinyl chloride powder, is positioned above the belt 11 and bolted through brackets 46 as at 47 to the carriage rails 31. The headbox 45 is thus transversely movable with the carriage 24 so as to "track" or achieve constant alignment with the processing belt.

The headbox 45 is welded to the brackets 46 which are bolted to the longitudinal carriage rails 31 at front and rear as shown. A powder inlet 50, powder level sensor 51 and sensor control unit 52 are mounted on the lid 53 of the headbox 45 which is also provided with a hinged inspection door 54 at the rear. A level sensor 51 and control unit 52 suitable for use with the invention are DYNATROL level detector type CL-10DJ with control unit EC-501A made by Automation Products, Inc., Houston, Tex.

A forward gate 55 supported at its ends in slots 56 in the brackets 46 and vertically adjustable by means of knurled adjusting screws 57 is provided to monitor the level of powder deposited on the belt surface by the headbox 45. Additional level controlling means are disposed within the box as required for the particular operation.

The headbox 45 is sealed to the flat section 36 of the belt 11 by a leather seal 58 clamped to the side of the box by a plate 59. See FIG. 3.

A die roller 61 positioned above the forward roll 33 is used to form a desired profile on the deposited powder. Roller 61 is journalled in the forward bracket 46 and is vertically adjustable by means of spring loaded knurled adjusting screws 62. The roller 61 is driven by an extensible drive 63 through a reduction gearbox 64 to achieve a surface speed relative to the speed of the belt 11 thus to form the desired contour on the powder. The drive 63 is made adjustable in length to accommodate the transverse movement of the carriage 24 on which the roller 61 is carried.

The headbox 45 is thus seen to support the powder level sensing apparatus, control powder flow, and provide final die and adjustment equipment for effecting a desirable powder profile.

The system 10 achieves constant matched tracking i.e., transverse alignment, of the headbox 45 with the belt 11. Consequently, nearly all of the belt width can be used for the product being made without loss of contact of the powder sealing apparatus with the belt. Former belt edge cleaning procedures necessitated by excess belt width are avoided.

Depositing the powder downstream of the drum 13 on the flat section 36 of the belt avoids the thickness control problems inherent in prior apparatus which deposited the powder directly over a supporting drum. Limitations on belt preheating are consequently avoided by the present apparatus Incorporation of the level sensing system accurately controls powder flow during processing, avoiding the necessity of recycling powder and, thereby, minimizing powder losses.

We claim:

1. An apparatus for controlling the deposition of powder and like materials on an endless moving belt, comprising
    base means;
    carriage means mounted on said base means beneath the endless moving belt at a location at which deposition of the materials on said belt is desired, said carriage means being transversely slideable with respect to said base means;
    belt follower means comprising a pair of cam followers mounted one on each side of said carriage means, each of said cam followers being adapted to contact a side edge of said belt for moving said carriage means transversely of said belt in either transverse direction to correspond with transverse movement of said belt; and
    deposition means mounted on said carriage means above said belt for depositing powder and like materials on said belt,
    said deposition means thereby achieving a transverse travel corresponding to transverse movement of said belt and consequent constant alignment therewith.

2. Apparatus as in claim 1 further comprising linear bearing means supported on said base means for slideable movement transversely with respect thereto, said carriage means being mounted on said bearing means.

3. In combination with an endless moving flat product supporting belt tracking over at least one support drum, powder deposition apparatus for achieving constant transverse alignment with said moving belt, comprising
    base means positioned forward of said support drum and including a pair of longitudinally extending members one on each side of said belt;
    rod means supported at its ends in said longitudinally extending members;
    linear bearing means supported on said rod means and transversely slideable with respect thereto;
    carriage means mounted on said linear bearing means beneath said belt and including longitudinally extending carriage rail means on each side of said belt;
    roller means mounted in said longitudinally extending carriage rail means for supporting said belt, said roller means comprising at least two rollers to provide a flat powder deposition section on said belt over said carriage means;

belt follower means comprising a pair of cam followers mounted one on each of said longitudinally extending carriage rail means, each of said cam followers contacting a side edge of said belt transversely to move said carriage means with respect to said base means corresponding to transverse movement of said belt;

powder deposition means mounted on said carriage means above said belt for depositing powder on said flat section thereof; and means for controlling the level of powder deposited by said deposition means.

4. The combination of claim 3 in which said rod means comprises a rod supported at its ends adjacent each end of said longitudinally extending members of said base means.

5. The combination of claim 3 in which said carriage means comprises a pair of transversely extending cross members mounted on said linear bearing means.

6. The combination of claim 3 in which said powder desposition means comprise a powder headbox attached to said longitudinally extending carriage rail means.

7. The combination of claim 6 in which said powder level controlling means comprise powder level sensor means attached to said powder headbox.

8. The combination of claim 6 further comprising sealing means attached to each side of said powder headbox for sealing said headbox to said belt.

9. The combination of claim 6 further comprising vertically adjustable gate means mounted on said powder headbox at the front thereof for controlling the level of powder deposited on said belt.

10. The combination of claim 6 further comprising die means attached to said powder headbox above one of said belt supporting roller means for forming a profile on the powder deposited by said headbox.

* * * * *